Feb. 17, 1931.  F. E. STOCKELBACH  1,792,716
PROCESS OF MAKING SAFROL DERIVATIVES SUCH AS
PROTOCATECHUIC ALDEHYDE AND ISOEUGENOL
Filed May 12, 1927
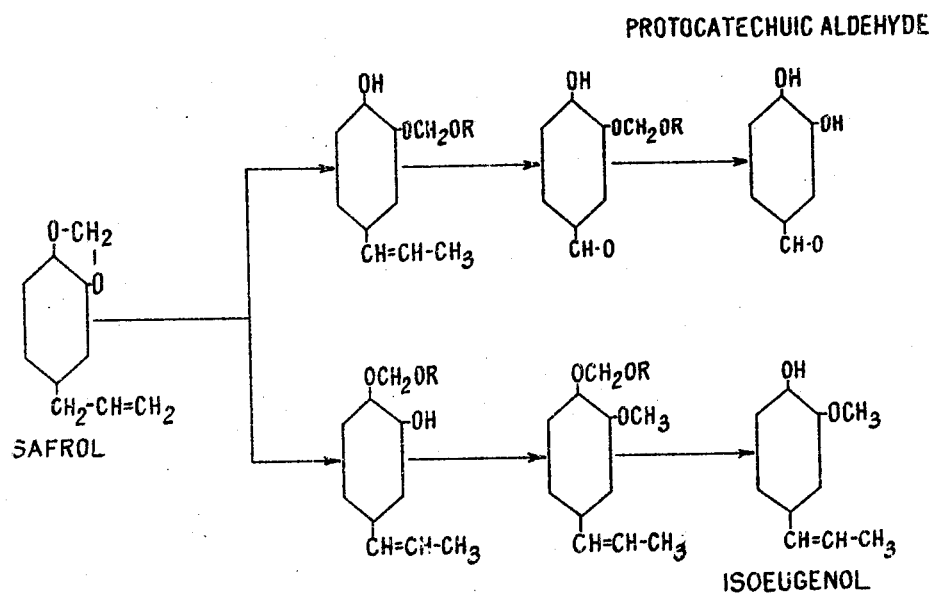
INVENTOR:
Fritz E. Stockelbach,
By Attorneys,
Fraser, Myers & Manley.

Patented Feb. 17, 1931

1,792,716

UNITED STATES PATENT OFFICE

FRITS E. STOCKELBACH, OF MONTCLAIR, NEW JERSEY

PROCESS OF MAKING SAFROL DERIVATIVES SUCH AS PROTOCATECHUIC ALDEHYDE AND ISOEUGENOL

Application filed May 12, 1927. Serial No. 190,744.

The present invention relates to the processes of making safrol derivatives, and more particularly to the processes of making protocatechuic aldehyde and isoeugenol from safrol.

The invention as herein described provides a simple, direct and cheap process of obtaining protocatechuic aldehyde from the relatively cheap and plentiful starting material safrol and of obtaining isoeugenol as a byproduct of said process.

The steps in the formation of protocatechuic aldehyde and isoeugenol from safrol are schematically represented in the accompanying drawing.

A particular description of the invention follows:

When safrol is heated with alcoholic potash to a temperature of 100°–120° C. an intra-molecular re-arrangement in the safrol molecule takes place resulting in the allyl group being transformed into a propenyl group, and isosafrol is the final product; but if the mixture is heated to 140°–170° C. a secondary reaction takes place resulting in the linkage between the methylene group and either one of the oxy groups being broken, while simultaneously therewith the alcohol radical attaches itself to the methylene group with the formation of phenol ethers of acetal-like character.

I have found, however, that contrary to previous investigations, safrol yields, when heated with alcoholic potash to a temperature of 140°–170° C., a mixture of two possible isomers, namely, 4-alkoxymethoxy-3-hydroxy-1-propenylbenzol, and 4-hydroxy-3-alkoxymethoxy-1-propenylbenzol. I have also found that when this mixture of these two isomers is subjected to the action of certain oxidizing agents, that only the 4-hydroxy isomer is oxidized, while the 3-hydroxy isomer remains unoxidized and is readily recoverable. This discovery on my part makes possible the commercial production of the technically important protocatechuic aldehyde and of obtaining as a byproduct the valuable phenol isoeugenol.

In order to enable those skilled in the art to practice the present invention, detailed descriptions of the procedure and of the quantities of the materials employed are here given.

A mixture of 1000 pounds safrol, 1000 pounds caustic potash and 1000 pounds of an alcohol having the general formula ROH, preferably ethyl alcohol, are heated in an autoclave to 140°–170° C. for about an hour. After cooling, the contents of the autoclave are dissolved in water and any unconverted oil steamed off, while the reaction product containing the two isomeric phenol ethers as salts remains in solution. The solution is then acidified with a dilute acid and the mixture of the two free isomeric ethers separated from the aqueous solution.

965 pounds of the mixture of the two isomeric phenols obtained according to the preceding paragraph are dissolved in 1000 pounds of caustic potash solution of about 51° Baumé, and to this solution is added 1000 pounds of aniline oil. After thorough mixing, the solution is allowed to settle, and the excess of caustic potash solution which separates out is drawn off from the bottom.

The clear solution of the phenol salts in aniline oil is then transferred to a still provided with an agitator, a jacket for heating and cooling, and a condenser, and to the solution is added 550 pounds of caustic soda solution of about 52° Baumé. The agitator is set in motion and the temperature brought up to about 110° C. To this alkaline mixture is then added 750 pounds of nitrobenzol, three to four hours being taken to add said nitrobenzol, care being exercised that the temperature shall remain between 120°–130° C. during the procedure. When all the nitrobenzol has been added, the mixture is allowed to digest for another hour or so and the temperature allowed to reach 140° C. During this last hour some water and aniline oil distils over and is recovered.

When the oxidizing action of the nitrobenzol upon the phenol salts is completed, steam is admitted into the jacket of the still and the contents of the still subjected to steam distillation, whereupon the free aniline oil with water vapor, together with the excess of nitrobenzol distils over. When the distillate shows that nearly all the oil has been distilled over, the steam distillation is discontinued and the contents of the still emptied into a tank having about three times the volume of the contents of the still, and enough hot water is added to fill the tank. The azobenzol formed by the reduction of the nitrobenzol separates as a heavy oil, which sinks to the bottom of the tank. The liquid in the tank is allowed to cool, at which time the azobenzol at the bottom of the tank will have solidified. The supernatant alkaline liquid is thereupon separated from the azobenzol in any desired manner.

This alkaline liquid contains at this stage of the process the sodium salts of the unoxidized 4-alkoxymethoxy-3-hydroxy-1-propenylbenzol and 4-hydroxy-3-alkoxymethoxy-1-benzaldehyde, which latter substance I believe to be new and never before isolated. The alkaline liquid is filtered through a filter press and transferred to a suitable tank provided with an agitator. 100 gallons of a suitable solvent such as toluol is added to the tank, the agitator set in motion, and sufficient sulphuric acid of about 29° Baumé slowly added so as to leave the solution slightly acid. When this point has been reached the agitator is stopped, and the toluol solution, which now contains the free aldehyde and the free unoxidized phenol hereinbefore specified, is allowed to separate from the aqueous solution.

The toluol solution is separated from the aqueous solution and transferred to a lead lined tank provided with an agitator, and the aqueous solution left in the first tank is extracted once more with toluol, this time with 50 gallons, allowed to separate as before, and the toluol solution separated from the aqueous solution and transferred to the toluol solution already in the lead lined tank.

In order to separate the aldehyde from the unoxidized phenol, both of which are contained in the toluol solution, the latter is extracted three times with an aqueous solution of sodium bisulphite with which the aldehyde combines, forming a soluble double salt of the usual type. When this extraction is completed there remains in the toluol solution only the unoxidized phenol, together with such impurities as are formed during the process, while the aqueous sodium bisulphite solution contains practically all the aldehyde in the form of a soluble double salt.

The aqueous solution containing the aldehyde is then heated in a lead lined tank with sufficient dilute sulphuric acid to liberate the sulphurous acid from the excess sodium bisulphite, as well as from the sodium bisulphite in combination with the aldehyde. The solution is boiled gently until all the gaseous sulphurous acid has been liberated. This treatment liberates first the aldehyde combined with the sodium bisulphite, and then causes a hydrolization of the alkoxymethoxy group, whereby said group is converted over into a hydroxy group with the formation of protocatechuic aldehyde. The protocatechuic aldehyde is obtained in a high state of purity and in good yield.

The toluol solution which contains the unoxidized phenol is now extracted with a ten per cent. caustic soda solution which dissolves the phenol, leaving back in the toluol impurities not soluble in alkali. From the alkaline solution the free phenol ether is obtained by adding sufficient sulphuric acid to render the solution acid, and the phenol ether separated out from the aqueous solution. A yield of about 400 pounds of the phenol ether 4-alkoxymethoxy-3-hydroxy-1-propenylbenzol is thus obtained.

To convert this phenol ether to isoeugenol it is methylated by dissolving it in a solution containing 943 pounds of water, 94½ pounds of caustic soda, and allowing 243 pounds of dimethyl sulphate to run into said solution under constant stirring. When methylation is completed the methylated oil comes to the top of the solution and is separated therefrom and washed until neutral. 400 pounds of the methylated oil is then boiled with a weak acid, preferably in the presence of methyl alcohol, until the reaction is complete, which usually requires several hours. The alcohol used is recovered by distillation, and the reaction product is washed and distilled in vacuum, and consists of pure isoeugenol, as indicated by the melting point of the acetyl and benzyl compounds formed from it. The yield of isoeugenol is excellent.

From the foregoing detailed descriptions it will be seen that I have devised novel and simple processes of cheaply obtaining protocatechuic aldehyde and isoeugenol from safrol, and that I have also isolated as an intermediate product in the formation of the protocatechuic aldehyde, a new substance, namely, 4-hydroxy-3-alkoxymethoxy-1-benzaldehyde.

While I have hereinbefore described certain preferred steps in the processes for obtaining safrol derivatives I do not wish to be limited to the specific reactions, substances employed and conditions of separating said substances, but deem it within the scope and spirit of my invention to deviate from these specific details within the scope of the appended claims.

What I claim is:

1. The process of obtaining derivatives from safrol which consists in converting safrol into a mixture of isomeric phenol ethers and oxidizing one of said phenol ethers to an aldehyde.

2. The process of obtaining derivatives from safrol which consists in converting safrol into a mixture of isomeric phenol ethers and treating the mixture of said isomeric phenol ethers with an oxidizing agent which will oxidize only one of said phenol ethers and not the other.

3. The process of obtaining derivatives from safrol which consists in converting safrol into a mixture of isomeric phenol ethers and treating the mixture of said isomeric phenol ethers in alkaline solution with an oxidizing agent which will oxidize only one of said isomers to an aldehyde.

4. The process of obtaining derivatives from safrol which consists in converting safrol into a mixture of the isomeric phenol ethers, 4-alkoxymethoxy-3-hydroxy-1-propenylbenzol and 4-hydroxy-3-alkoxymethoxy-1-propenylbenzol and treating the mixture of said isomeric phenol ethers to oxidize the 4-hydroxy product to 4-hydroxy-3-alkoxymethoxy-1-benzaldehyde.

5. The process of obtaining derivatives from safrol which consists in converting safrol into a mixture of the isomeric phenol ethers, 4-alkoxymethoxy-3-hydroxy-1-propenylbenzol and 4-hydroxy-3-alkoxymethoxy-1-propenylbenzol and treating a mixture of said isomeric phenol ethers with an oxidizing agent which will oxidize the 4-hydroxy product to 4-hydroxy-3-alkoxymethoxy-1-benzaldehyde and not oxidize the 3-hydroxy product.

6. The process of obtaining derivatives from safrol which consists in converting safrol into a mixture of the isomeric phenol ethers, 4-alkoxymethoxy-3-hydroxy-1-propenylbenzol and 4-hydroxy-3-alkoxymethoxy-1-propenylbenzol and treating a mixture of said isomeric phenol ethers in alkaline solution with nitrobenzol.

7. A new chemical compound having the formula 4-hydroxy-3-alkoxymethoxy-1-benzaldehyde.

8. The process of obtaining derivatives from safrol, one of said derivatives being protocatechuic aldehyde which consists in treating the 4-hydroxy-3-alkoxymethoxy-1-benzaldehyde obtained according to claim 6 with substances to convert the alkoxymethoxy group to a hydroxy group.

9. The process of obtaining derivatives from safrol, one of said derivatives being protocatechuic aldehyde which consists in dissolving the 4-hydroxy-3-alkoxymethoxy-1-benzaldehyde obtained according to claim 6 in an aqueous sodium bisulphite solution, and heating the solution with dilute acid to liberate the sulphurous acid and cause a hydrolization of the alkoxymethoxy group to a hydroxy group.

10. The process of obtaining derivatives from safrol, one of said derivatives being protocatechuic aldehyde and the other derivative being isoeugenol which consists in heating safrol with caustic alkali and an alcohol of the general formula ROH to a temperature of 140°–170° C., acidifying the reaction product to obtain a mixture of the two isomeric phenol ethers 4-alkoxymethoxy-3-hydroxy-1-propenylbenzol and 4-hydroxy-3-alkoxymethoxy-1-propenylbenzol, treating the mixture of said isomeric phenol ethers in alkaline solution with an oxidizing substance which will oxidize the lateral chain of the 4-hydroxy product to produce the corresponding aldehyde having a mixed ether group and leave the 3-hydroxy product unoxidized, separating the aldehyde from the unoxidized phenol ether, converting the mixed ether group of the aldehyde to a hydroxy group, and treating the unoxidized phenol ether to convert the hydroxy group to a methoxy group and the alkoxymethoxy group to a hydroxy group.

11. The process of obtaining derivatives from safrol, one of said derivatives being protocatechuic aldehyle and the other derivative being isoeugenol which consists in heating safrol with caustic alkali and an alcohol of the general formula ROH to a temperature of 140°–170° C., acidifying the reaction product to obtain a mixture of the two isomeric phenol ethers 4-alkoxymethoxy-3-hydroxy-1-propenylbenzol and 4-hydroxy-3-alkoxymethoxy-1-propenylbenzol, treating the mixture of said isomeric phenol ethers in alkaline solution with an oxidizing substance which will oxidize the lateral chain of the 4-hydroxy product to produce the corresponding aldehyde having a mixed ether group and leave the 3-hydroxy product unoxidized, separating the aldehyde from the unoxidized phenol ether, converting the mixed ether group of the aldehyde to a hydroxy group, and treating the unoxidized phenol ether to convert in successive steps the hydroxy group to a methoxy group and the alkoxymethoxy group to a hydroxy group.

12. The process of obtaining safrol derivatives which consists in converting safrol into a mixture of two isomeric phenols having a lateral chain —CH=CH—CH$_3$ and treating the mixture of said isomeric phenols with an oxidizing agent which will oxidize the lateral chain of one of said phenols to produce the corresponding aldehyde and leave the other phenol unoxidized.

13. The process of obtaining safrol derivatives which consists in converting safrol into a mixture of two isomeric phenols having a lateral chain —CH=CH—CH$_3$ and treating the mixture of said isomeric phenols with nitrobenzol in the presence of an excess of free alkali which will oxidize the lateral chain of one of said phenols to produce the corresponding aldehyde and leave the other phenol unoxidized.

14. The process of oxidizing only one of a mixture of two isomeric carbon compounds having a benzene nucleus with a lateral chain —CH=CH—$CH_3$ to produce its corresponding aldehyde, which consists in treating said mixture with nitro-benzol.

15. A new composition of matter consisting of a mixture of 4-alkoxymethoxy-3-hydroxy-1-propenylbenzol and 4-hydroxy-3-alkoxymethoxy-1-benzaldehyde.

In witness whereof, I have hereunto signed my name.

FRITS E. STOCKELBACH.